United States Patent
Hod et al.

(10) Patent No.: US 9,229,878 B2
(45) Date of Patent: Jan. 5, 2016

(54) MEMORY PAGE OFFLOADING IN MULTI-NODE COMPUTER SYSTEMS

(71) Applicant: Red Hat Israel, Ltd., Raanana (IL)

(72) Inventors: Ronen Hod, Shoham (IL); Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 31 days.

(21) Appl. No.: 13/914,109

(22) Filed: Jun. 10, 2013

(65) Prior Publication Data

US 2014/0365738 A1   Dec. 11, 2014

(51) Int. Cl.
| | |
|---|---|
| G06F 12/08 | (2006.01) |
| G06F 12/12 | (2006.01) |
| G06F 12/02 | (2006.01) |
| G06F 9/50 | (2006.01) |
| G06F 11/30 | (2006.01) |
| G06F 11/34 | (2006.01) |

(52) U.S. Cl.
CPC ............ *G06F 12/122* (2013.01); *G06F 9/5016* (2013.01); *G06F 9/5033* (2013.01); *G06F 11/30* (2013.01); *G06F 11/34* (2013.01); *G06F 12/0284* (2013.01); *G06F 12/08* (2013.01)

(58) Field of Classification Search
None
See application file for complete search history.

(56) References Cited

U.S. PATENT DOCUMENTS

| | | | |
|---|---|---|---|
| 6,658,538 B2 | 12/2003 | Arimilli et al. | |
| 8,140,817 B2 | 3/2012 | Schopp et al. | |
| 8,245,008 B2 | 8/2012 | Kaminski et al. | |
| 8,307,192 B2 | 11/2012 | Pandey et al. | |
| 8,312,219 B2 | 11/2012 | Cher et al. | |
| 2004/0019891 A1* | 1/2004 | Koenen | 718/102 |
| 2005/0257010 A1* | 11/2005 | Jones et al. | 711/133 |
| 2012/0117299 A1 | 5/2012 | Waldspurger et al. | |
| 2012/0124269 A1 | 5/2012 | Garg et al. | |
| 2012/0198187 A1* | 8/2012 | Accapadi et al. | 711/160 |
| 2012/0210065 A1 | 8/2012 | Karthikesan | |

OTHER PUBLICATIONS

LaRowe, R., Jr., "Page Placement for Non-Uniform Memory Access Time (NUMA) Shared Memory Multiprocessors", Dissertation, Duke University Department of Computer Science, 1991.

* cited by examiner

*Primary Examiner* — Gary Portka
(74) *Attorney, Agent, or Firm* — Lowenstein Sandler LLP

(57) ABSTRACT

Systems and methods for memory page offloading in multi-processor computer systems. An example method may comprise: detecting, by a computer system, a memory pressure condition on a first node; invalidating a page table entry for a memory page residing on the first node; copying the memory page to a second node; and updating the page table entry for the memory page to reference the second node.

20 Claims, 7 Drawing Sheets

SRAT 400

| 410 Proximity Domain | 420 Resource |
|---|---|
| 0 | Processor 0 |
| 0 | Memory 0 |
| 1 | Processor 1 |
| 1 | Memory 1 |
| 2 | Processor 2 |

FIG. 4

SLIT 500

|   | 0 | 1 | 2 | 3 | 4 |
|---|---|---|---|---|---|
| 0 | 10 | 20 | 30 | 40 | 255 |
| 1 | 20 | 10 | 20 | 30 | 255 |
| 2 | 30 | 20 | 10 | 20 | 30 |
| 3 | 40 | 30 | 20 | 10 | 20 |
| 4 | 255 | 255 | 30 | 20 | 10 |

FIG. 5

MEMORY PAGE OFFLOADING IN MULTI-NODE COMPUTER SYSTEMS

TECHNICAL FIELD

The present disclosure is generally related to distributed computer systems, and is more specifically related to systems and methods for memory management in multi-processor computer systems.

BACKGROUND

In a multi-processor computer system, a processor may access various memory devices in a number of ways ranging from local memory access via a common bus to foreign memory access via other devices, including other processors. For example, in a symmetric multi-processing (SMP) architecture, processors may directly access all memory devices. However, as the number of processors in a computer system increases, providing an adequate bandwidth for symmetric interconnection between processors and memory devices becomes more and more difficult.

In a non-uniform memory access (NUMA) system, requirements to the bandwidth between processors and memory devices are typically alleviated by connecting each processor directly to some memory devices, while providing the processor with indirect connections (e.g., via other processors) to some other memory devices. Hence, in some situations, NUMA systems may perform better than SMP systems since the aggregate memory access bandwidth usually increases as more nodes are added to the NUMA system, while in the SMP architecture the common bus interconnecting processors and memory devices may become a performance bottleneck.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 4 schematically illustrates one example of a Static Resource Affinity Table (SRAT) structure;

FIG. 5 schematically illustrates one example of a System Locality Information Table (SLIT) structure;

DETAILED DESCRIPTION

Described herein are methods and systems for memory page offloading in multi-processor computer systems. In certain implementations, a computer system may support the non-uniform memory access (NUMA) architectural model, according to which a physical processor of a multi-processor computer system may be directly connected to some memory devices while being indirectly connected (e.g., via other processors) to some other memory devices. A NUMA system may be characterized by the system topology information including memory access latency values for one or more processors accessing memory pages residing on various memory devices. Herein, "local" memory access refers to a memory access via a local bus (e.g., PCI bus), and "foreign" memory access refers to a memory access via other devices such as other processors and/or system area networks.

In certain implementations, the overall performance of a NUMA system may be improved by increasing the ratio of local to foreign memory accesses by all processors, since not only foreign memory accesses usually take longer time, but they may also lead to contentions for the resources involved in foreign memory accesses. In one illustrative example, a multi-processor computer system may improve the system performance by allocating the memory from the local node to the processor that executes the memory requesting thread. "Node" herein refers to a group of one or more processors and one or more associated memory devices locally accessible by the processors in the group. In another illustrative example, a multi-processor computer system may improve the system performance by allocating the memory from the node which is topologically closest to the processor executing the memory requesting thread.

To implement the above referenced and other memory allocation policies, a multi-node computer system may, responsive to detecting a memory pressure condition on one of the nodes, migrate one or more memory pages to another node. In certain implementation, the migration process may include invalidating page table entries corresponding to the memory pages being migrated, moving the memory pages to one or more nodes different from the source node, and updating the affected page table entries to reflect the page migration. Various aspects of the above referenced methods and systems are described in details herein below by way of examples, rather than by way of limitation.

Figure 1A:
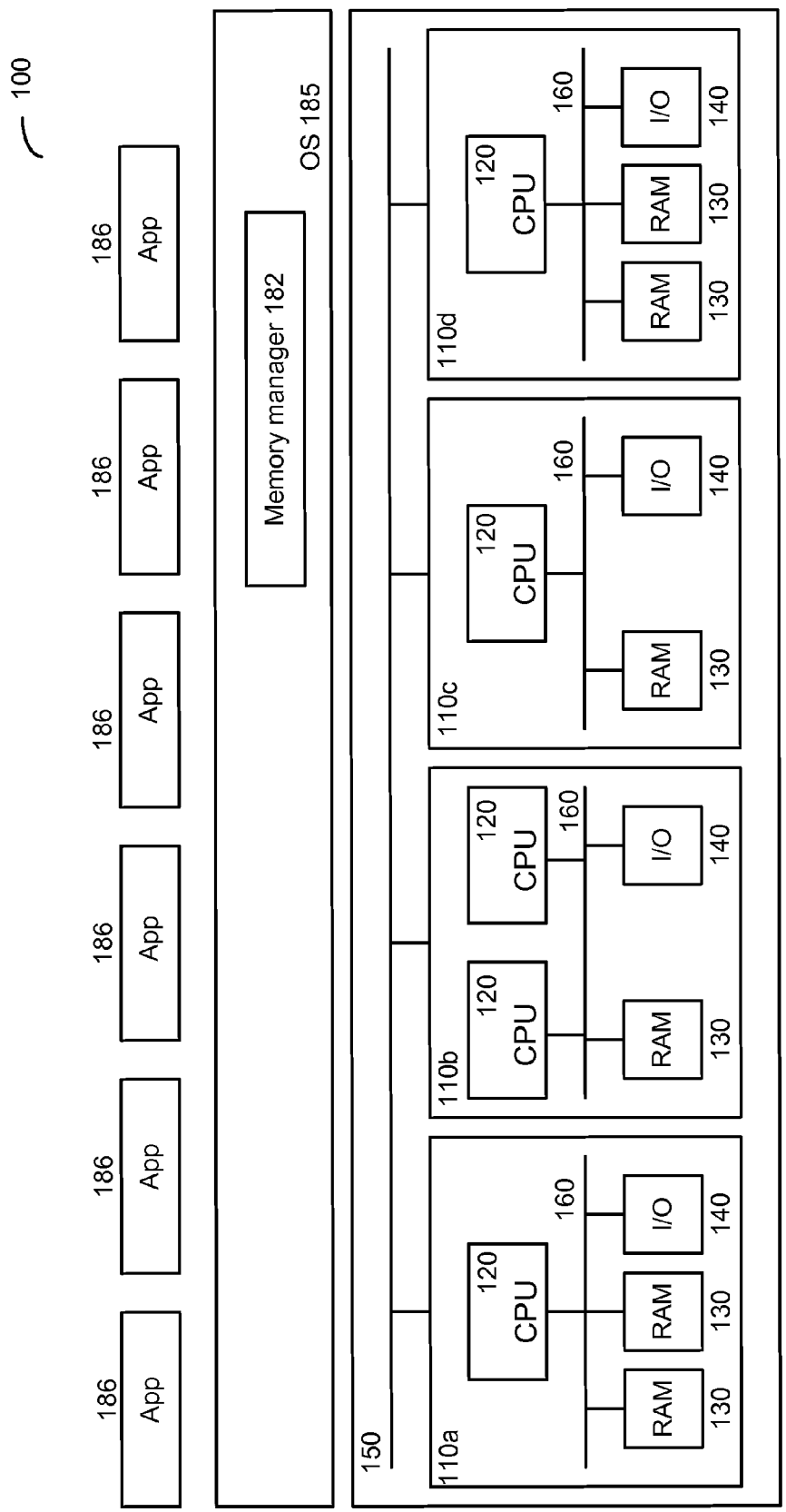
FIGS. 1A-1B depict high-level component diagrams of illustrative embodiments of a distributed computer system 100 in accordance with one or more aspects of the present disclosure.
Figure 1B:
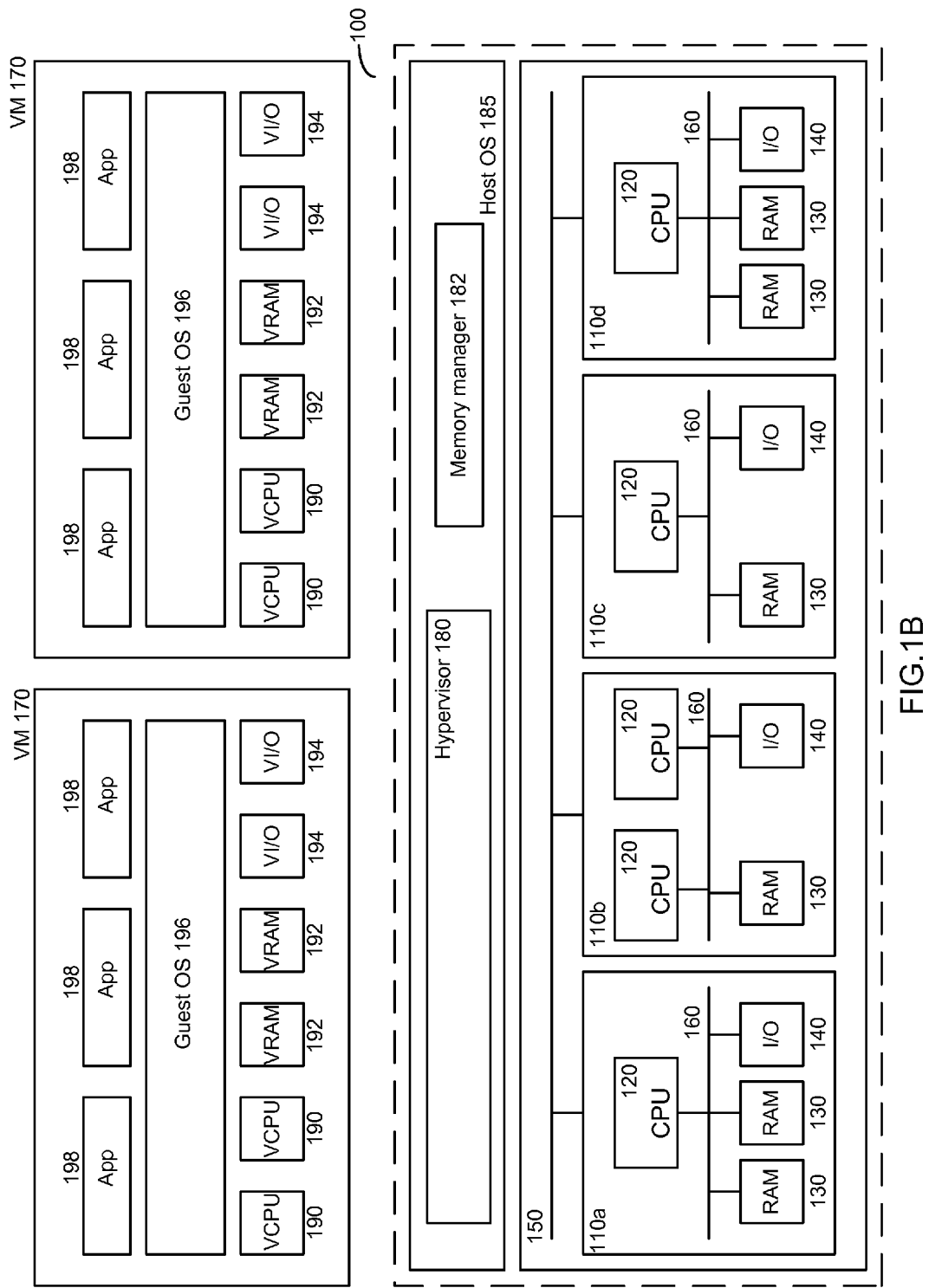

FIGS. 1A-1B depict high-level component diagrams of illustrative embodiments of a multi-processor computer system 100 in accordance with one or more aspects of the present disclosure. The computer system 100 may include one or more interconnected nodes 110a-110z. Each node 110 may in turn include one or more physical processors 120 communicatively coupled to memory devices 130 and input/output (I/O) devices 140.

"Physical processor" or "processor" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein refers to a volatile or non-volatile memory device, such as RAM, ROM, EEPROM, or any other device capable of storing data. "I/O device" herein refers to a device capable of providing an interface between one or more processor pins and an external device capable of inputting and/or outputting binary data.

Processors 120 may be interconnected using a variety of techniques, ranging from a point-to-point processor interconnect to a system area network 150, as shown in FIGS. 1A-1B. Local connections within each node 110, including the connections between a processor 120 and a memory 130 and between a processor 120 and an I/O device 140 may be provided by one or more local buses 160 of suitable architecture.

In one illustrative example, as schematically shown in FIG. 1A, the computer system 100 may execute an operating system 185 and one or more applications 186. In another illustrative example, as schematically shown in FIG. 1B, the computer system 100 may run multiple virtual machines 170, by executing a software layer 180, often referred to as "hypervisor," above the hardware and below the virtual machines. In certain implementations, the hypervisor 180 may be a component of the operating system 185 executed by the host computer system 100. Alternatively, the hypervisor 180 may be provided by an application running under the host operating system 185, or may run directly on the host computer system 100 without an operating system beneath it. The hypervisor 180 may abstract the physical layer, including processors, memory, and I/O devices, and present this abstraction to virtual machines 170 as virtual devices, including virtual processors 190, virtual memory 192, and virtual I/O devices 194. A virtual machine 170 may execute a guest operating system 196 which may utilize the underlying virtual devices 190, 192, and 194, each of which may map to a device of the host machine (e.g., a network interface device, a CD-ROM drive, etc.). One or more applications 198 may be running on a virtual machine 170 under the guest operating system 196.

In the examples of FIGS. 1A-1B, the host operating system 185 or hypervisor 180 may include a memory manager component 182 designated to allocate memory pages in response to requests by the operating system and applications. In certain implementations, the computer system 100 may implement a virtual memory system where pages of a thread's address space are mapped to the physical memory which may reside on a local node or a remote node, with respect to the processor executing the thread requesting memory allocation (memory requesting thread). The address space virtualization may be handled through the processor's paging mechanism. Paging may support a virtual memory environment where a large linear address space is simulated with a smaller amount of random access memory (RAM) and some disk storage. Each segment may be divided into pages of a defined size (e.g., 4 KB) which may be stored either in RAM or on the disk. The operating system may maintain a page directory and a set of page tables to keep track of the pages. When a thread attempts to access an address location in the linear address space, the processor may use the page directory and page tables to translate the linear address into a physical address. If the page being accessed is not currently in physical memory, the processor may generate a page-fault exception, and the operating system may then read the page from the disk and continue executing the thread.

Figure 2:
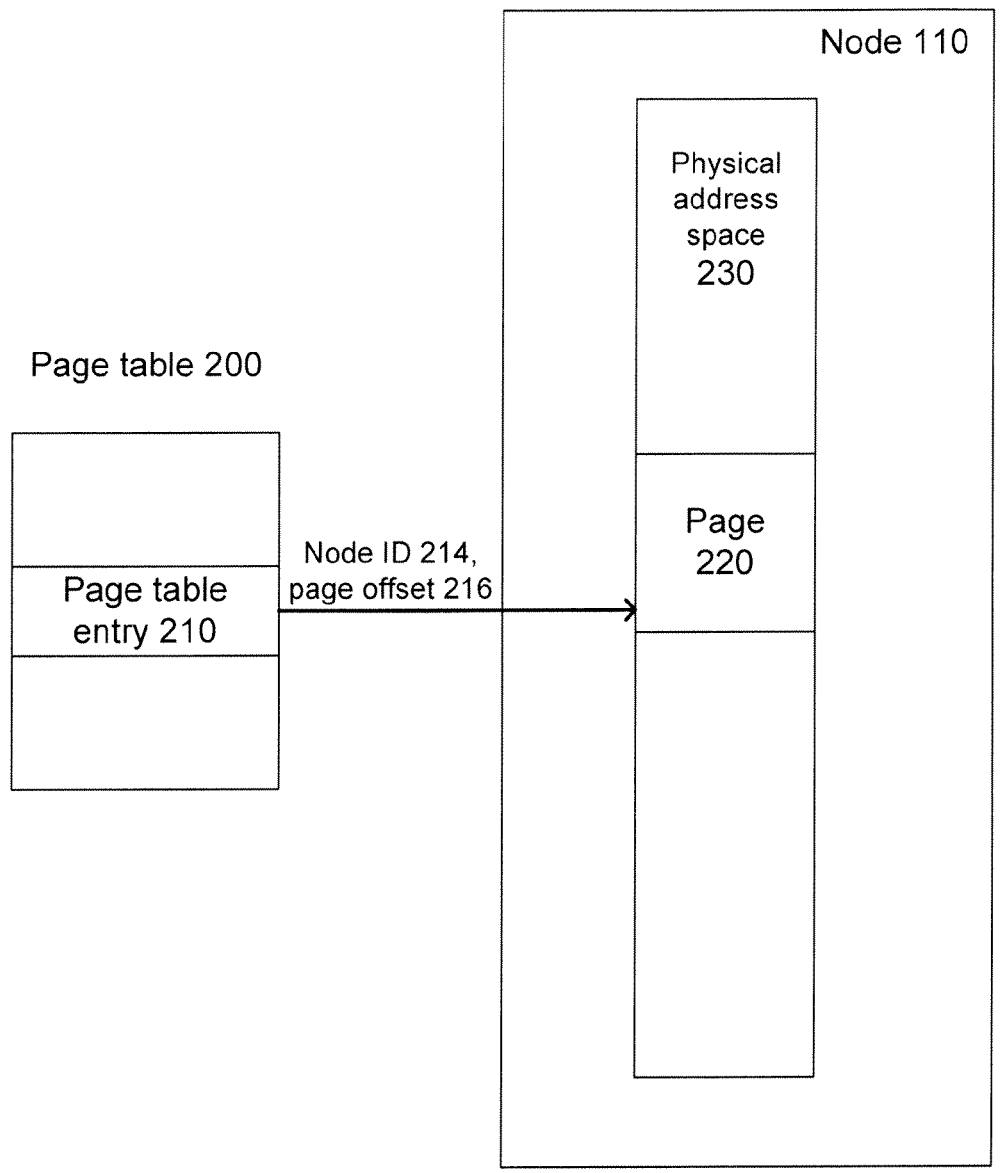
FIG. 2 schematically illustrates an example of a paging mechanism implementation, in accordance with one or more aspects of the present disclosure.

FIG. 2 schematically illustrates an example of a paging mechanism implementation by the memory manager 182, in accordance with one or more aspects of the present disclosure. Page table herein refers to a memory structure translating virtual memory addresses to physical memory addresses. As schematically illustrated by FIG. 2, the page table 200 maintained by the operating system 185 may include a plurality of page table entries 210 corresponding to a plurality of memory pages residing on the plurality of nodes 110a-110z of FIG. 1. Each page table entry 210 may include a node identifier 214 identifying the node on which the page 220 resides, and the page offset 216 within the physical address space 230 of the node.

In certain implementations, the memory manager component 182 may be designated to allocate the memory from a particular node, e.g., the local node with respect to the processor executing the memory requesting thread, or the node which is topologically closest to the processor executing the memory requesting thread. To implement the memory allocation policy supporting the source node designation, the memory manager component 182 may be designated, responsive to detecting a memory pressure condition on one of the nodes, to move one or more memory pages to one or more nodes different from the source node. The page migration may be accomplished by invalidating page table entries corresponding to one or more memory pages being migrated, moving the memory pages to one or more nodes, and updating the affected page table entries to reflect the page migration, as described in more details herein below.

Detecting the memory pressure on a particular node may be performed based on one or more metrics. In one illustrative example, a low physical memory threshold may be defined for each node, and the memory pressure condition may be diagnosed responsive to determining that the available physical memory on a particular node is below the specified threshold. In another illustrative example, a page fault threshold frequency may be defined for each node, and the memory pressure condition may be diagnosed responsive to determining that the count of memory page faults within a unit of time, with respect to the pages residing on a particular node, exceeds the page fault threshold. In certain implementations, one or more actions directed to detecting the memory pressure, including comparing the amount of available physical memory to the low physical memory threshold and/or comparing the page fault count to the page fault threshold, may be performed periodically, at a pre-defined frequency (e.g., responsive to a timer event). Alternatively, the memory pressure condition may be diagnosed responsive to the memory manager's failing to allocate one or more memory pages on a particular node (e.g., on the local node).

Responsive to detecting the memory pressure on a particular node (e.g., on the local node), the computer system 100 may perform one or more corrective actions, including reclaiming unused memory pages and/or migrating one or more memory pages to another node. In one illustrative example, the computer system 100 may select one or more least recently used (LRU) memory pages, residing on the source node, to be migrated to another node. In another example, the computer system 100 may select for migration one or more memory pages residing on the source node that have not been accessed within a defined period of time preceding the memory manager's action to select one or more pages to be migrated. In another example, the computer system 100 may select for migration one or more memory pages residing on the source node and having the lowest access count.

In certain implementations, the computer system 100 may "launder" a memory page to be migrated by synchronizing the memory page with the backing storage, and then swapping the memory page into disk storage, thus releasing the physical memory previously occupied by the migrated page on the local node. However, page migration via swapping might significantly affect the overall system performance since disk operations may be up to several orders of magnitude slower than memory operations. Furthermore, frequent page swapping may lead to a self-accelerating process involving a chain of page swaps when a recently swapped out page is brought back in responsive to a page fault, which, in turn, triggers swapping out another page.

To improve the page migration efficiency, the computer system 100 may, in certain implementations, perform direct node-to-node page migration, as described herein below. Before performing the actual copying of the memory page contents from the source to the destination node, the computer system 100 may invalidate page table entries corresponding to the memory pages being migrated, thus precluding the modification of the memory pages while they are being migrated. In one illustrative example, the memory pages may be marked as being read-only, thus allowing reading but not modification of the pages being migrated. In another illustrative example, the memory pages may be marked as being only accessible by privileged threads (e.g., by the kernel threads), thus preventing application programs from accessing the pages being migrated.

Figure 3:
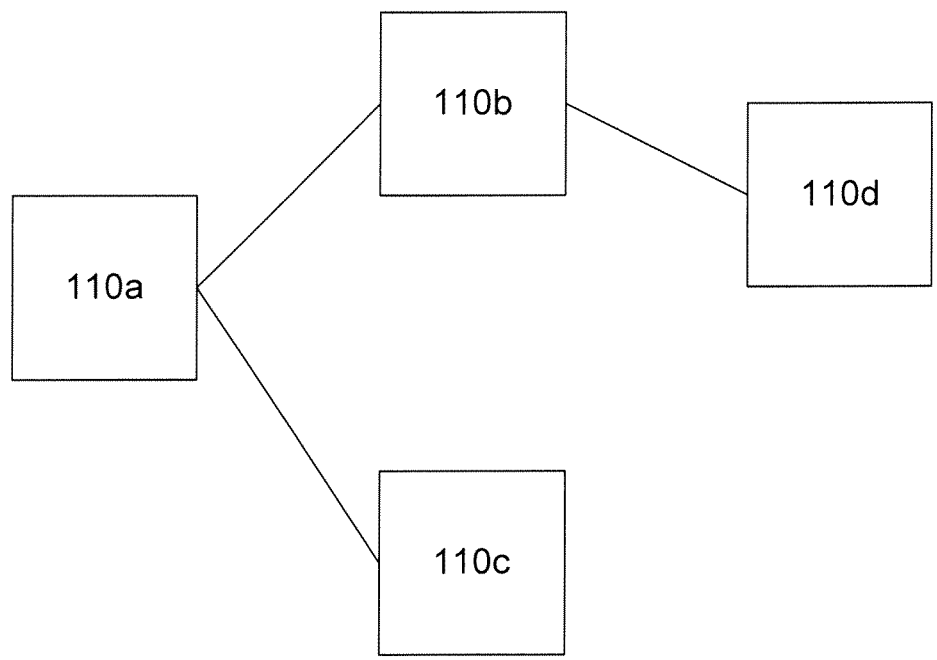
FIG. 3 schematically illustrates selecting a destination node for migrating one or more memory pages, in accordance with one or more aspects of the present disclosure.

Upon invalidating the page table entries, the computer system 100 may select the destination node for the memory pages being migrated, as described herein below with references to FIG. 3. In one illustrative example, the computer system 100 may select the destination node 110b as being the topologically closest node to the local node 110a (assuming that the topology metrics reflects the inter-node access time, as described in more details herein below), thus reducing the access time to the memory pages which have been migrated. In another example, the computer system 100 may select the destination node 110d as having the maximum amount of physical memory available, among the plurality of nodes 110b-110d, thus potentially allowing more memory to be reserved on the same node with the migrated pages. In another example, the computer system 100 may select the destination node 110c as having the least load on one or more physical processors among the plurality of nodes 110b-110d, thus potentially allowing the thread owning the migrated memory pages to also be migrated to the destination node. In certain implementations, the computer system 100 may select two or more destination nodes for two or more memory pages being migrated, using the above described destination node selection criteria.

Upon selecting one or more destination nodes for the pages being migrated, computer system 100 may copy the memory pages to the selected destination nodes, and update the affected page table entries to reflect the new nodes for the migrated memory pages. In one illustrative example, a page table entry may include the destination node identifier and an offset of the memory page within the node physical address space.

In certain implementations, upon migrating one or more memory pages to another node, the computer system 100 may, responsive to determining that an access count to the memory page exceeds an access count threshold, migrate the pages back to the source node. As noted herein above, the page migration may be accomplished by invalidating page table entries corresponding to the memory pages being migrated, moving the memory pages to the source node, and updating the affected page table entries to reflect the page migration.

The computer system 100 may employ various methods to store the system topology information needed for implementing the above referenced memory allocation policy. In certain implementations, the computer system 100 may employ Static Resource Affinity Table (SRAT) and System Locality Information Table (SLIT) defined by Advanced Configuration and Power Interface (ACPI) Specification for storing the system topology information.

A SRAT may include a plurality of entries associating a processor or a block of memory with an integer value identifying a proximity domain. "Proximity domain" herein refers to a collection of devices (e.g., processors and memory devices) such that the processors belonging to the collection have the same access latency to the memory devices belonging to the collection, and that latency value is typically less that the access latency of any processor belonging to the collection accessing any memory outside of the collection. A proximity domain identifier may also identify a NUMA node, and a SRAT entry may associate a processor or a memory device with a particular NUMA node.

In one illustrative example, the SRAT may include a header that identifies a variable number of entries referred to as Static Resource Allocation Structures. Two types of structures may be used to populate the table entries: Processor Local Affinity Structures and Memory Affinity Structures. A Processor Affinity Structure may identify a specific processor by Advanced Programmable Interrupt Controller (APIC) or Streamlined Advanced Programmable Interrupt Controller (SAPIC) identifier, and associate that processor with a proximity domain. A Memory Affinity Structure may identify a memory block by its base address and length, and associate that memory block with a proximity domain. Each structure may contain other fields and adhere to a specific format prescribed by the ACPI Specification. FIG. 4 schematically illustrates one example of a SRAT structure. A SRAT 400 may include two columns: a proximity domain column 410 and a resource column 420. The computer system 100 may populate the proximity domain column 410 with proximity domain identifier values, and populate the resource column 420 with processor identifier values and/or memory block identifier values. Depending on a particular implementation, the SRAT may be stored in a memory as a vector, a two-dimensional array, or a more complex data structure.

Access latencies between proximity domains may be stored in a SLIT. FIG. 5 schematically illustrates one example of a SLIT structure. A SLIT may be provided by a two-dimensional table 500 storing relative access latencies from one proximity domain to another. Hence, the SLIT value stored within a cell addressable by a pair of integer values (i, j) may represent the relative access latency between i-th and j-th proximity domains. Due to the fact that a SLIT may be symmetrical relative to its leading diagonal, in some implementations the SLIT is not stored as a full two-dimensional matrix but as a different data structure (e.g., a single dimensional array having its elements mapped to a triangular matrix).

Figure 6:
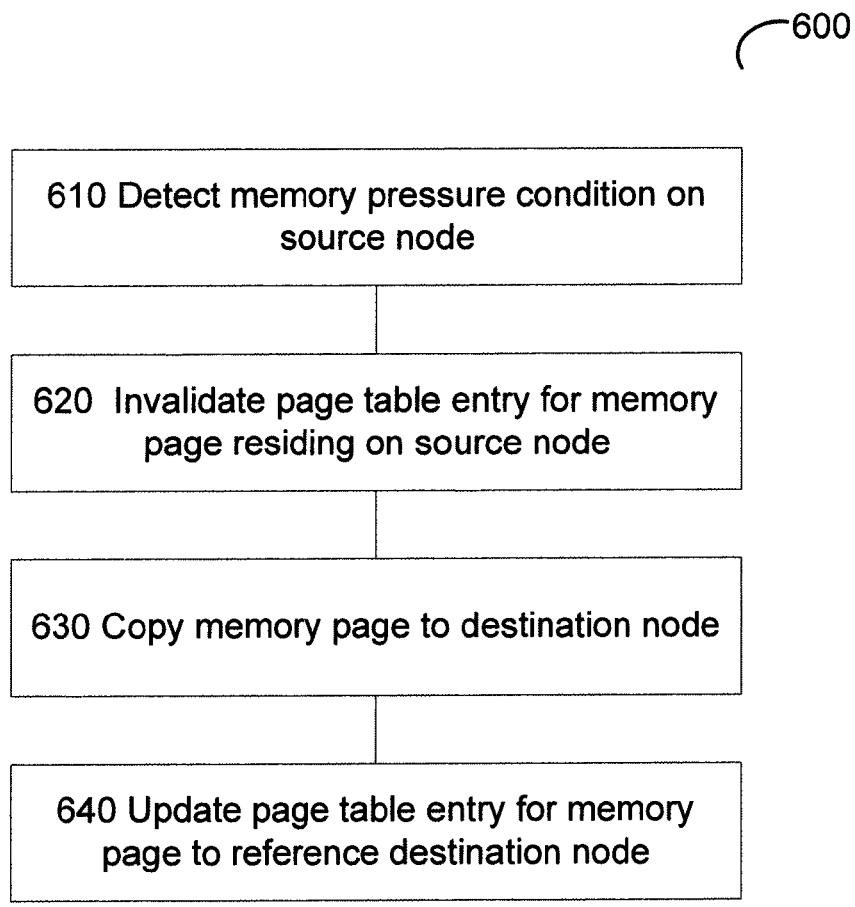
FIG. 6 depicts a flow diagram of a method for memory page offloading in a multi-node computer system, in accordance with one or more aspects of the present disclosure.

In certain embodiments, the access latency to local memory may be represented by an arbitrarily selected integer value, and hence the leading diagonal of the SLIT may be filled with the same integer value indicating a processor accessing memory within the same proximity domain. In one illustrative example, the value of 10 may be used for the local access latency. In certain embodiments, SLIT entries representing foreign memory access may be filled in with integer values indicating the foreign memory access latency relative to the local memory access. In one illustrative example, the foreign memory access latency which is 1.5 times longer than the local memory access latency would be represented by the value of 15, while the foreign memory access latency which is two times longer than the local memory access latency would be represented by the value of 20. In certain embodiments, the access latency to an unreachable memory may be represented by an arbitrarily selected integer value. In one illustrative example, the value of 255 may be used to represent the access latency to an unreachable memory. FIG. 6 depicts a flow diagram of one embodiment of a method 600 for memory page offloading in a multi-processor computer system. The method 600 may be performed by a computer system that may comprise hardware (e.g., circuitry, dedicated logic, and/or programmable logic), software (e.g., instructions executable on a computer system to perform hardware simulation), or a combination thereof. In one illustrative example, the method 600 may be performed by the memory manager 182. The method 600 and/or each of its individual functions, routines, subroutines, or operations may be performed by one or more physical processors of the computer system executing the method.

At block 610, the computer system may detect a memory pressure condition on a first node. As noted herein above, detecting the memory pressure on a particular node may be performed based on one or more metrics, including determining that the available physical memory on a particular node is below a specified threshold or determining that the count of memory page faults within a unit of time, with respect to the pages residing on a particular node, exceeds the page fault threshold. Alternatively, the memory pressure condition may be diagnosed responsive to the memory manager's failing to allocate one or more memory pages on a particular node (e.g., on the local node).

At block 620, the computer system may invalidate a page table entry for a memory page residing on the first node. As noted herein above, the computer system 100 may select one or more least recently used (LRU) memory pages, residing on the source node, to be migrated to another node. In another example, the computer system 100 may select for migration one or more memory pages residing on the source node that have not been accessed within a defined period of time preceding the memory manager's action to select one or more pages to be migrated. In another example, the computer system 100 may select for migration one or more memory pages residing on the source node and having the lowest access count.

At block 630, the computer system may copy the memory page to a destination node. As noted herein above, the computer system 100 may select the destination node being the topologically closest node to the source node, thus reducing the access time to the memory pages which have been migrated. In another example, the computer system 100 may select the destination node having the maximum amount of physical memory available, among the plurality of nodes, thus potentially allowing more memory to be reserved on the same node with the migrated pages. In another example, the computer system 100 may select the destination node having the least load on one or more physical processors among the plurality of nodes, thus potentially allowing the thread owning the migrated memory pages to also be migrated to the destination node.

At block 640, the computer system may update the page table entry for the memory page to reference the second node. Upon completing the operations schematically described by block 640, the method may terminate.

Figure 7:
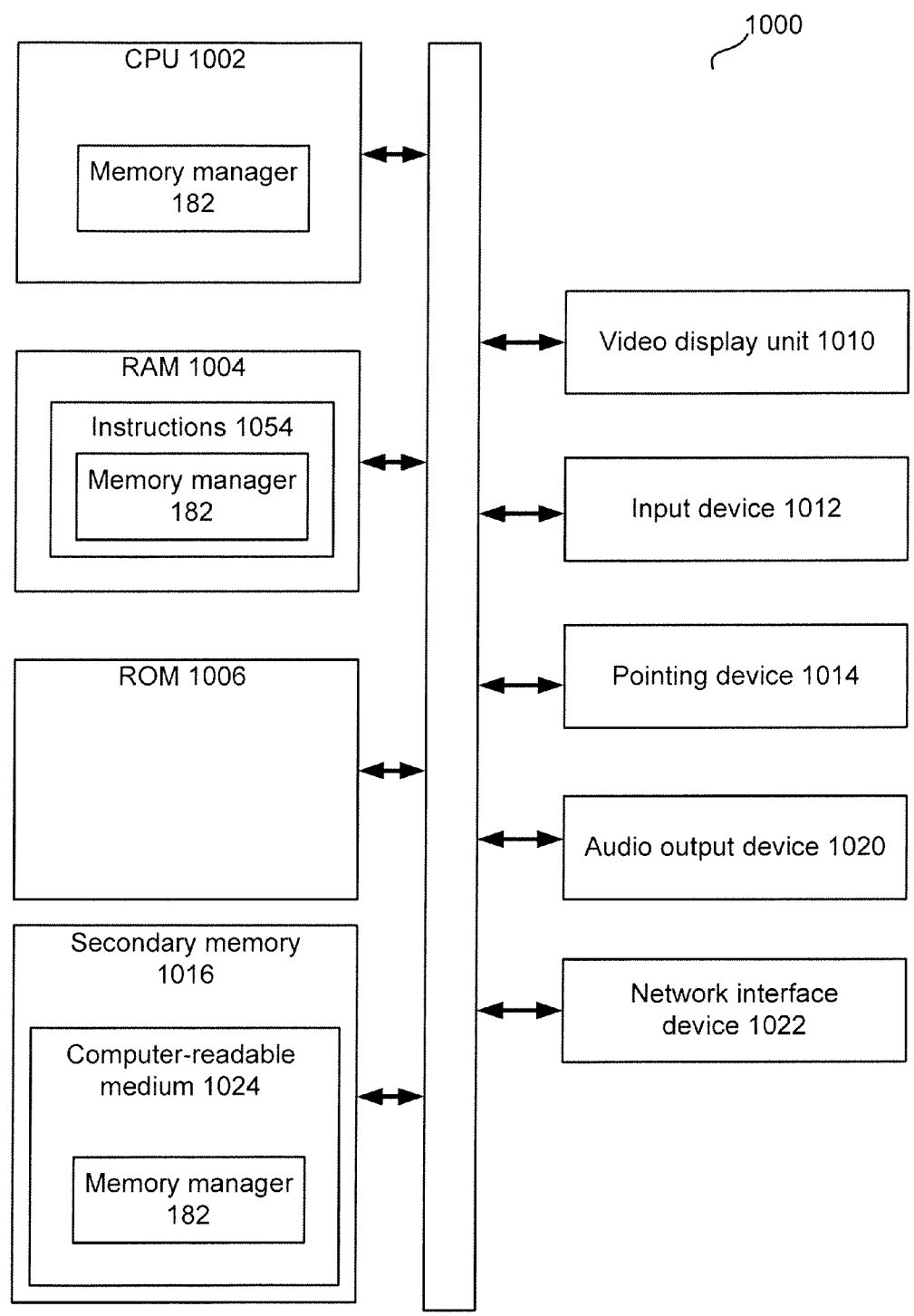
FIG. 7 depicts a block diagram of an illustrative computer system operating in accordance with examples of the present disclosure.

FIG. 7 depicts an example computer system 1000 within which a set of instructions, for causing the computer system to perform any one or more of the methods described herein, may be executed. In certain embodiments, the computer system 1000 may correspond to host computer system 100 of FIG. 1.

In certain embodiments, the computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" may include any collection of computers that individually or jointly execute a set (or multiple sets) of instructions to perform any one or more of the methods described herein.

In a further aspect, the computer system 1000 may include a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further include a network interface device 1022. The computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may include a non-transitory computer-readable storage medium 1024 on which may be stored instructions of the memory manager 182. Instructions of the memory manager 182 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative embodiment as a single medium, the term "computer-readable storage medium" may include a single medium or multiple media (e.g., a centralized or distributed database, and/or associated caches and servers) that store the one or more sets of executable instructions. The term "computer-readable storage medium" may also include any non-transitory medium that is capable of storing or encoding a set of instructions for execution by a computer that cause the computer to perform any one or more of the methods described herein. The term "computer-readable storage medium" may include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
   detecting, by a processor, a memory pressure condition on a first node;
   invalidating a page table entry for a memory page residing on the first node;
   copying, by the processor, the memory page directly to a second node without swapping the memory page to a backing storage; and
   updating the page table entry for the memory page to reference the second node.

2. The method of claim 1, wherein the first node and the second node are represented by Non-Uniform Memory Access (NUMA) nodes.

3. The method of claim 1, wherein the detecting comprises determining that an amount of available memory on the first node is below an available memory threshold.

4. The method of claim 1, wherein the detecting comprises determining that a number of page faults exceeds a page fault threshold.

5. The method of claim 1, wherein the detecting is performed periodically with a defined frequency.

6. The method of claim 1, wherein the detecting is performed responsive to failing to satisfy a memory allocation request on the first node.

7. The method of claim 1, wherein the invalidating comprises selecting a least recently used memory page.

8. The method of claim 1, wherein the copying comprises selecting the second node as being topologically closest to the first node.

9. The method of claim 1, wherein the copying comprises selecting the second node as having a maximum amount of memory available among two or more candidate nodes.

10. The method of claim 1, wherein the copying comprises selecting the second node as having a minimal load on one or more processors among two or more candidate nodes.

11. The method of claim 1, further comprising:
    determining that an access count to the memory page copied to the second node exceeds an access count threshold;
    invalidating the page table entry;
    copying the memory page to the first node; and
    updating the page table entry for the memory page to reference the first node.

12. A system comprising:
    a memory; and
    a processor, operatively coupled to the memory, to:
      detect a memory pressure condition on a first node;
      invalidate a page table entry for a memory page residing on the first node;
      copy the memory page directly to a second node without swapping the memory page to a backing storage; and
      update the page table entry for the memory page to reference the second node.

13. The system of claim 12, wherein the first node and the second node are represented by Non-Uniform Memory Access (NUMA) nodes.

14. The system of claim 12, wherein to detect a memory pressure condition on a first node, the processor is to determine that an amount of available memory on the first node is below an available memory threshold.

15. The system of claim 12, wherein to detect a memory pressure condition on a first node, the processor is to determine that a number of page faults exceeds a page fault threshold.

16. The system of claim 12, wherein the processor is to periodically with a defined frequency evaluate the memory pressure condition on the first node.

17. The system of claim 12, wherein to copy the memory page to the second node, the processor is to select the second node as being topologically closest to the first node.

18. The system of claim 12, wherein to copy the memory page to the second node, the processor is to select the second node as having a maximum amount of memory available among two or more candidate nodes.

19. The system of claim 12, wherein to copy the memory page to the second node, the processor is to select the second node as having a minimal load on one or more physical processors among two or more candidate nodes.

20. A computer-readable non-transitory storage medium comprising executable instructions to cause a processor to:
    detect, by the processor, a memory pressure condition on a first node;
    invalidate a page table entry for a memory page residing on the first node;
    copy the memory page directly to a second node without swapping the memory page to a backing storage; and
    update the page table entry for the memory page to reference the second node.

* * * * *